(12) United States Patent
Masuda et al.

(10) Patent No.: US 11,131,254 B2
(45) Date of Patent: Sep. 28, 2021

(54) MARINE ENGINE

(71) Applicant: IHI CORPORATION, Tokyo (JP)

(72) Inventors: Yutaka Masuda, Tokyo (JP);
Yoshiyuki Umemoto, Hyogo (JP);
Toshihiko Shimizu, Hyogo (JP);
Takahiro Takimoto, Hyogo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/894,749

(22) Filed: Jun. 5, 2020

(65) Prior Publication Data
US 2020/0300183 A1 Sep. 24, 2020

Related U.S. Application Data

(63) Continuation of application No. PCT/JP2019/010588, filed on Mar. 14, 2019.

(30) Foreign Application Priority Data

Mar. 16, 2018 (JP) .............................. JP2018-050004

(51) Int. Cl.
*F02D 15/00* (2006.01)
*B63H 21/21* (2006.01)
(Continued)

(52) U.S. Cl.
CPC ............. *F02D 15/00* (2013.01); *B63H 21/21* (2013.01); *F02B 61/045* (2013.01); *F02B 75/047* (2013.01); *F02D 41/009* (2013.01)

(58) Field of Classification Search
CPC ........ F02D 15/00; F02D 15/02; F02D 41/009; F02D 41/1497; F02D 2250/28;
(Continued)

(56) References Cited

U.S. PATENT DOCUMENTS 5,909,720 A 6/1999 Yamaoka et al.
7,966,980 B2 * 6/2011 Lee ..................... F02B 75/045
123/48 B
(Continued)

FOREIGN PATENT DOCUMENTS

DE 69703518 T2 6/2001
EP 0447697 A3 12/1990
(Continued)

OTHER PUBLICATIONS

International Search Report issued in Application No. PCT/JP2019/010588, dated Apr. 16, 2019, 3 pages.

*Primary Examiner* — Grant Moubry
(74) *Attorney, Agent, or Firm* — Rothwell, Figg, Ernst & Manbeck, P.C.

(57) ABSTRACT

Provided is a marine engine, including: a piston; and a compression ratio controller configured to execute lowering processing of moving a top dead center position of the piston toward a bottom dead center side when an engine rotation speed falls within a resonance occurrence range set in advance. A geometrical compression ratio is reduced, and a resonance stress caused by a torsional vibration in a rotary system can thus be suppressed while suppressing a decrease in thermal efficiency compared with a case in which retarding control is applied to a fuel injection timing or a closing timing of an exhaust valve.

2 Claims, 5 Drawing Sheets

(51) Int. Cl.
*F02B 61/04* (2006.01)
*F02B 75/04* (2006.01)
*F02D 41/00* (2006.01)

(58) Field of Classification Search
CPC ...... F02B 61/045; F02B 75/045; F02B 75/04; F02B 25/04; F02B 77/085; F16C 5/00; F16C 7/06; F01B 31/14; B63H 21/21; F01M 2001/006
See application file for complete search history.

(56) References Cited

U.S. PATENT DOCUMENTS

| | | | | |
|---|---|---|---|---|
| 8,364,382 | B2* | 1/2013 | Irisawa | F02D 13/0234 701/103 |
| 8,468,823 | B2* | 6/2013 | Hitomi | F02D 41/402 60/611 |
| 8,544,444 | B2* | 10/2013 | Hitomi | F02D 41/3047 123/294 |
| 9,982,596 | B2* | 5/2018 | Brendel | F16J 1/14 |
| 2007/0234990 | A1 | 10/2007 | Shiino et al. | |
| 2010/0236523 | A1* | 9/2010 | Saruwatari | F02D 13/0238 123/436 |
| 2015/0233309 | A1* | 8/2015 | Tanaka | F02D 15/04 123/48 C |

FOREIGN PATENT DOCUMENTS

| | | |
|---|---|---|
| EP | 0447697 A2 | 9/1991 |
| EP | 0819561 A2 | 1/1998 |
| JP | H10-82332 A | 3/1998 |
| JP | 3004307 B2 | 11/1999 |
| JP | 2001-123857 A | 5/2001 |
| JP | 2007-32388 A | 2/2007 |
| JP | 2007-170198 A | 7/2007 |
| JP | 2007-278146 A | 10/2007 |
| JP | 2010-242690 A | 10/2010 |
| JP | 2013-124652 A | 6/2013 |
| JP | 2017-015063 A | 1/2017 |

* cited by examiner

MARINE ENGINE

CROSS REFERENCE TO RELATED APPLICATIONS

This application is a continuation application of International Application No. PCT/JP2019/010588, filed on Mar. 14, 2019, which claims priority to Japanese Patent Application No. 2018-050004, filed on Mar. 16, 2018, the entire contents of which are incorporated by reference herein.

BACKGROUND ART

Technical Field

The present disclosure relates to a marine engine. This application claims the benefit of priority to Japanese Patent Application No. 2018-050004 filed on Mar. 16, 2018, and contents thereof are incorporated herein.

Related Art

In a marine engine, when an excitation force is applied from a piston to a rotary shaft system including, for example, a crankshaft, torsional vibration occurs. When an engine rotation speed falls within a resonance occurrence range, there is a fear in that the rotary shaft system may resonate. Therefore, a barred range containing the resonance occurrence range is set in some cases. When the engine rotation speed falls into the barred range, engine output is automatically controlled so that the engine rotation speed falls out of the barred range. Navigation in the barred range cannot be maintained, and operability thus decreases.

In Patent Literature 1, there is disclosed a technology of changing a fuel injection timing or a fuel injection period to make an adjustment so as to reduce an excitation torque component in a vicinity of a resonance point of the torsional vibration of the crankshaft.

CITATION LIST

Patent Literature

Patent Literature 1: JP 3004307 B2

SUMMARY

Technical Problem

When the fuel injection timing or the fuel injection period is changed so as to reduce the excitation torque component as disclosed in Patent Literature 1, thermal efficiency decreases.

The present disclosure has been made in view of the above-mentioned problem, and has an object to provide a marine engine capable of suppressing a resonance stress caused by torsional vibration of a rotary shaft system while suppressing a decrease in thermal efficiency.

Solution to Problem

In order to solve the above-mentioned problem, according to one embodiment of the present disclosure, there is provided a marine engine, including: a piston; and a compression ratio controller configured to execute lowering processing of moving a top dead center position of the piston toward a bottom dead center side when an engine rotation speed falls within a resonance occurrence range set in advance.

The compression ratio controller may be configured to control the top dead center position of the piston so that a torsional stress of a crankshaft approaches an allowable stress of the crankshaft when the engine rotation speed falls within the resonance occurrence range.

The marine engine may further include a detector configured to detect a rotation variation of the crankshaft, and the compression ratio controller may be configured to apply feedback control to the top dead center position of the piston so that the torsional stress identified from the detected rotation variation approaches the allowable stress.

Effects of Disclosure

According to the marine engine of the present disclosure, it is possible to suppress a resonance stress caused by torsional vibration of a rotary shaft system while suppressing a decrease in thermal efficiency.

DESCRIPTION OF EMBODIMENTS

Figure 1:
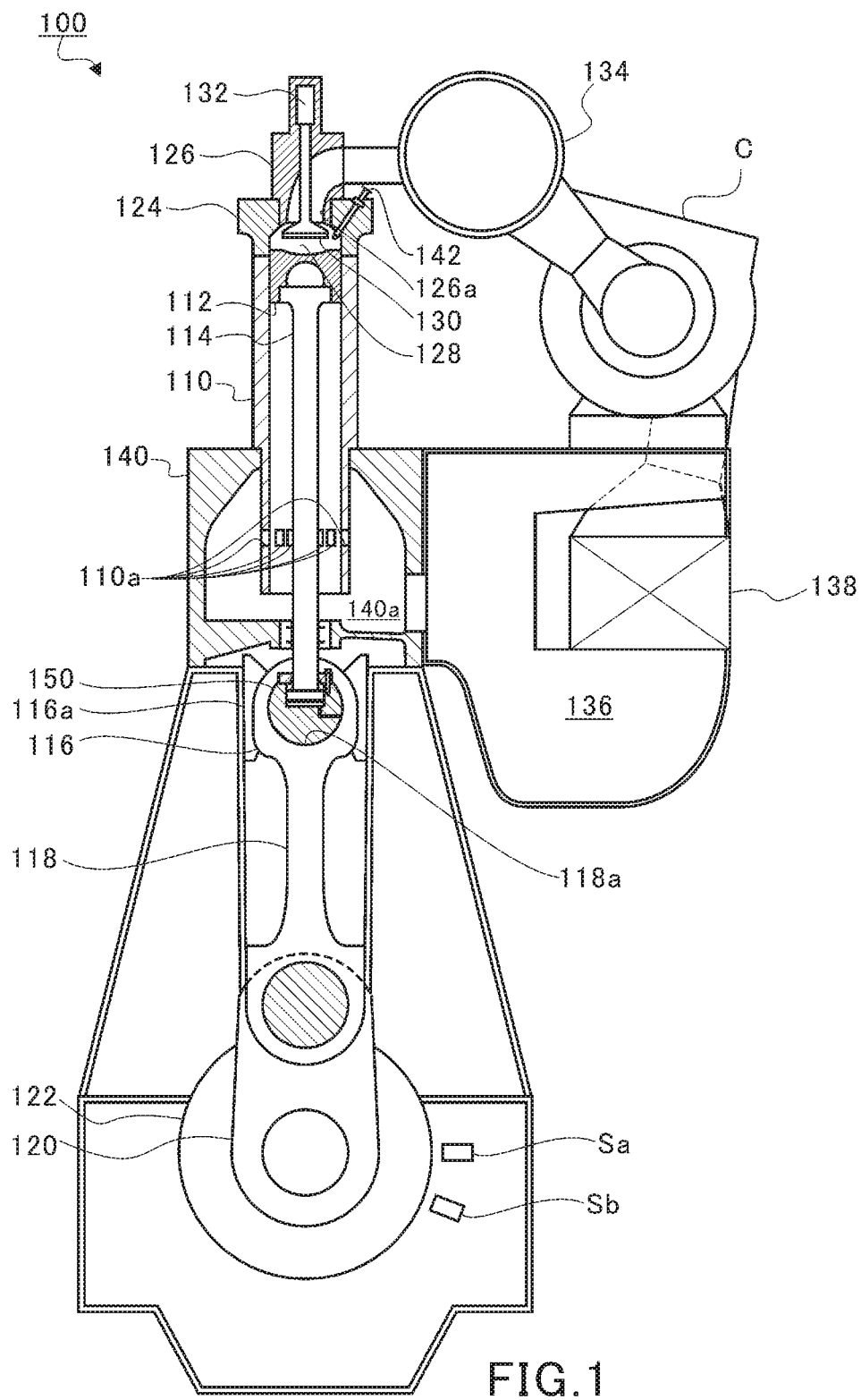
FIG. 1 is an explanatory view for illustrating an overall configuration of a marine engine.

Now, with reference to the attached drawings, an embodiment of the present disclosure is described in detail. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is an explanatory view for illustrating an overall configuration of a marine engine 100. As illustrated in FIG. 1, the marine engine 100 includes a cylinder 110, a piston 112, a piston rod 114, a crosshead 116, a connecting rod 118, a crankshaft 120, a flywheel 122, a cylinder cover 124, an exhaust valve cage 126, a combustion chamber 128, an exhaust valve 130, an exhaust valve drive device 132, an exhaust pipe 134, a scavenge reservoir 136, a cooler 138, a cylinder jacket 140, and a fuel injection valve 142.

The piston 112 is provided inside the cylinder 110. The piston 112 reciprocates inside the cylinder 110. One end of the piston rod 114 is attached to the piston 112. A crosshead pin 150 of the crosshead 116 is coupled to another end of the piston rod 114. The crosshead 116 reciprocates together with the piston 112. A movement of the crosshead 116 in a right-and-left direction (direction perpendicular to a stroke direction of the piston 112) in FIG. 1 is regulated by a guide shoe 116a.

The crosshead pin 150 is pivotally supported by a crosshead bearing 118a provided at one end of the connecting rod 118. The crosshead pin 150 supports one end of the connecting rod 118. The another end of the piston rod 114 and the one end of the connecting rod 118 are connected to each other through an intermediation of the crosshead 116.

Another end of the connecting rod 118 is coupled to the crankshaft 120. The crankshaft 120 is rotatable with respect to the connecting rod 118. When the crosshead 116 reciprocates along with the reciprocation of the piston 112, the crankshaft 120 rotates.

The flywheel 122 is mounted to the crankshaft 120. A rotation sensor Sa and a pulse counter Sb (detector) are provided in a vicinity of an outer peripheral surface of the flywheel 122. The rotation sensor Sa is configured to detect an engine rotation speed. The pulse counter Sb is configured to detect a crank angle. For example, a plurality of protrusions (not shown) are formed at predetermined intervals on the outer peripheral surface of the flywheel 122. The rotation sensor Sa and the pulse counter Sb may detect the engine rotation speed and the crank angle based on the protrusions of the flywheel 122.

The cylinder cover 124 is provided at a top end of the cylinder 110. The exhaust valve cage 126 is inserted through the cylinder cover 124. One end of the exhaust valve cage 126 faces the piston 112. An exhaust port 126a is opened in the one end of the exhaust valve cage 126. The exhaust port 126a is opened to the combustion chamber 128. The combustion chamber 128 is formed inside the cylinder 110 so as to be surrounded by the cylinder cover 124, the cylinder 110, and the piston 112.

A valve body of the exhaust valve 130 is located in the combustion chamber 128. An exhaust valve drive device 132 is attached to a rod portion of the exhaust valve 130. The exhaust valve drive device 132 is arranged in the exhaust valve cage 126. The exhaust valve drive device 132 moves the exhaust valve 130 in the stroke direction of the piston 112.

When the exhaust valve 130 moves toward the piston 112 side to open, exhaust gas generated in the cylinder 110 after combustion is discharged from the exhaust port 126a. After the exhaust gas is discharged, the exhaust valve 130 moves toward the exhaust valve cage 126 side to close the exhaust port 126a.

An exhaust pipe 134 is attached to the exhaust valve cage 126 and a supercharger C. An inside of the exhaust pipe 134 communicates with the exhaust port 126a and a turbine of the supercharger C. The exhaust gas discharged from the exhaust port 126a is supplied to the turbine (not shown) of the supercharger C through the exhaust pipe 134, and is then discharged to the outside.

Moreover, active gas is pressurized by a compressor (not shown) of the supercharger C. In this state, the active gas is, for example, air. The pressurized active gas is cooled by the cooler 138 in the scavenge reservoir 136. A bottom end of the cylinder 110 is surrounded by a cylinder jacket 140. A scavenge chamber 140a is formed inside the cylinder jacket 140. The active gas after the cooling is forcibly fed into the scavenge chamber 140a.

Scavenging ports 110a are formed on a bottom end side of the cylinder 110. The scavenging port 110a is a hole passing from an inner peripheral surface to an outer peripheral surface of the cylinder 110. A plurality of scavenging ports 110a are formed at intervals in a circumferential direction of the cylinder 110.

When the piston 112 moves toward the bottom dead center side with respect to the scavenging ports 110a, the active gas is sucked from the scavenging ports 110a into the cylinder 110 by a pressure difference between the scavenge chamber 140a and the inside of the cylinder 110.

Moreover, a fuel injection valve 142 is provided in the cylinder cover 124. A distal end of the fuel injection valve 142 is directed toward the combustion chamber 128 side. The fuel injection valve 142 injects a liquid fuel (fuel oil) into the combustion chamber 128. The liquid fuel is combusted, and expansion pressure generated by the combustion causes the piston 112 to reciprocate.

Figure 2:
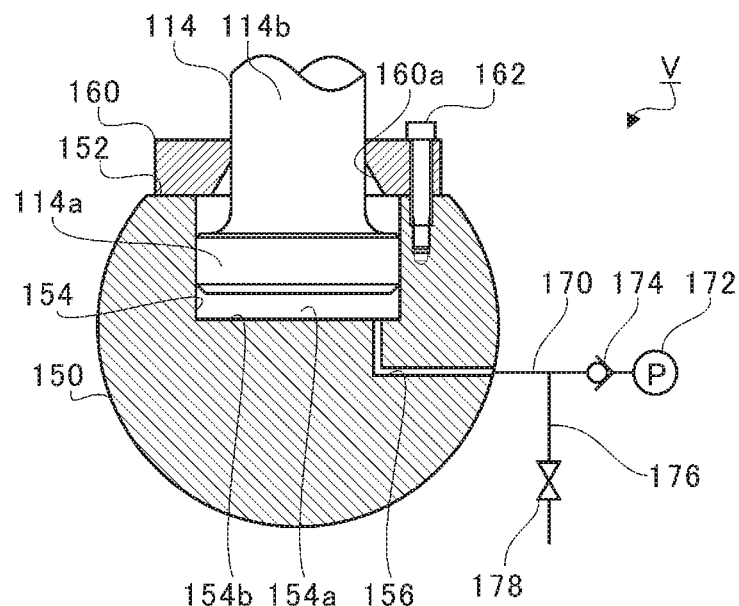
FIG. 2 is an extracted view for illustrating a coupling portion between a piston rod and a crosshead pin.

FIG. 2 is an extracted view for illustrating a coupling portion between the piston rod 114 and the crosshead pin 150. As illustrated in FIG. 2, a flat surface portion 152 is formed on an outer peripheral surface on the piston 112 side of the crosshead pin 150. The flat surface portion 152 extends in a direction substantially perpendicular to the stroke direction of the piston 112.

A pin hole 154 is formed in the crosshead pin 150. The pin hole 154 is opened in the flat surface portion 152. The pin hole 154 extends from the flat surface portion 152 toward the crankshaft 120 side (lower side in FIG. 2) along the stroke direction.

A cover member 160 is provided on the flat surface portion 152 of the crosshead pin 150. The cover member 160 is attached to the flat surface portion 152 of the crosshead pin 150 by a fastening member 162. The cover member 160 covers the pin hole 154. A cover hole 160a passing in the stroke direction is formed in the cover member 160.

The piston rod 114 includes a large-diameter portion 114a and a small-diameter portion 114b. An outer diameter of the large-diameter portion 114a is larger than an outer diameter of the small-diameter portion 114b. The large-diameter portion 114a is formed at the another end of the piston rod 114. The large-diameter portion 114a is inserted into the pin hole 154 of the crosshead pin 150. The small-diameter portion 114b is formed at the one end side of the piston rod 114 with respect to the large-diameter portion 114a. The small-diameter portion 114b is inserted into the cover hole 160a of the cover member 160.

A hydraulic chamber 154a is formed inside the pin hole 154. The pin hole 154 is partitioned by the large-diameter portion 114a in the stroke direction. The hydraulic chamber 154a is a space defined on a bottom surface 154b side of the pin hole 154 partitioned by the large-diameter portion 114a.

One end of an oil passage 156 is opened in the bottom surface 154b. Another end of the oil passage 156 is opened to an outside of the crosshead pin 150. A hydraulic pipe 170 is connected to the another end of the oil passage 156. A hydraulic pump 172 communicates with the hydraulic pipe 170. A check valve 174 is provided between the hydraulic pump 172 and the oil passage 156. A flow of working oil flowing from the oil passage 156 side toward the hydraulic pump 172 side is suppressed by the check valve 174. The working oil is forcibly fed into the hydraulic chamber 154a from the hydraulic pump 172 through the oil passage 156.

A branch pipe 176 is connected to the hydraulic pipe 170 between the oil passage 156 and the check valve 174. A selector valve 178 is provided to the branch pipe 176. The selector valve 178 is, for example, an electromagnetic valve. The selector valve 178 is closed during an operation of the hydraulic pump 172. When the selector valve 178 is opened while the hydraulic pump 172 is stopped, the working oil is discharged from the hydraulic chamber 154a toward the branch pipe 176 side. The selector valve 178 communicates with an oil tank (not shown) on a side opposite to the oil passage 156. The discharged working oil is retained in the oil tank. The oil tank supplies the working oil to the hydraulic pump 172.

The large-diameter portion 114a slides on an inner peripheral surface of the pin hole 154 in the stroke direction in accordance with an oil amount of the working oil in the hydraulic chamber 154a. As a result, the piston rod 114 moves in the stroke direction. The piston 112 moves together with the piston rod 114. Accordingly, the top dead center position of the piston 112 is variable.

That is, the marine engine 100 includes a compression ratio changing mechanism V. The compression ratio changing mechanism V includes the hydraulic chamber 154a and the large-diameter portion 114a of the piston rod 114. The compression ratio changing mechanism V moves the top dead center position of the piston 112 so that the compression ratio is changeable.

The description has been given of the case in which the one hydraulic chamber 154a is provided. However, a space on the cover member 160 side of the pin hole 154 partitioned by the large-diameter portion 114a may also be a hydraulic chamber. This hydraulic chamber may be used together with the hydraulic chamber 154a or may be used individually.

Figure 3:
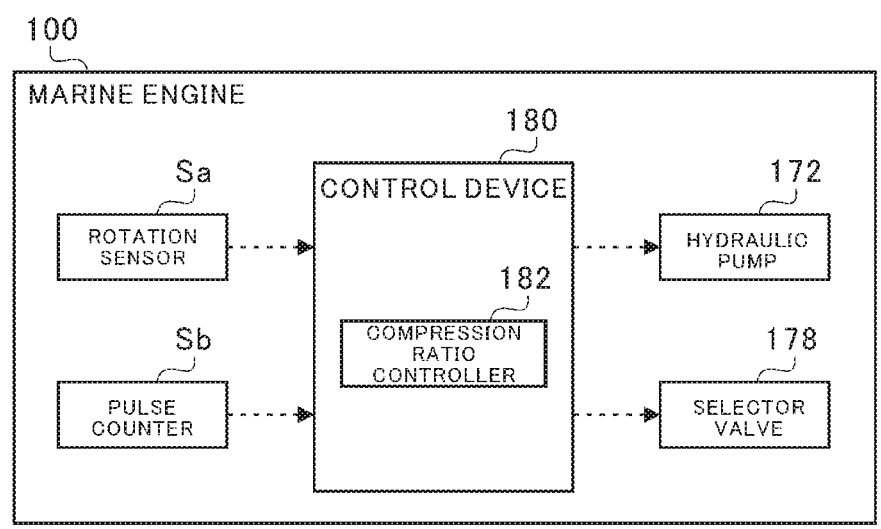
FIG. 3 is a functional block diagram for illustrating the marine engine.

FIG. 3 is a functional block diagram for illustrating the marine engine 100. In FIG. 3, a configuration relating to control for the compression ratio changing mechanism V is mainly illustrated. As illustrated in FIG. 3, the marine engine 100 includes a control device 180. The control device 180 is formed of, for example, an engine control unit (ECU). The control device 180 is formed of a central processing unit (CPU), a ROM storing programs and the like, a RAM serving as a work area, and the like, and is configured to control the entire marine engine 100. Moreover, the control device 180 functions as a compression ratio controller 182.

The compression ratio controller 182 is configured to control the hydraulic pump 172 and the selector valve 178 to move the top dead center position of the piston 112. Specifically, the control device 180 receives a signal indicating the engine rotation speed from the rotation sensor Sa. The control device 180 receives a signal indicating the crank angle from the pulse counter Sb. Then, when the engine rotation speed indicated by the signal from the rotation sensor Sa falls within a resonance occurrence range set in advance, the compression ratio controller 182 executes lowering processing of moving a top dead center position of the piston 112 toward a bottom dead center side.

Figure 4:
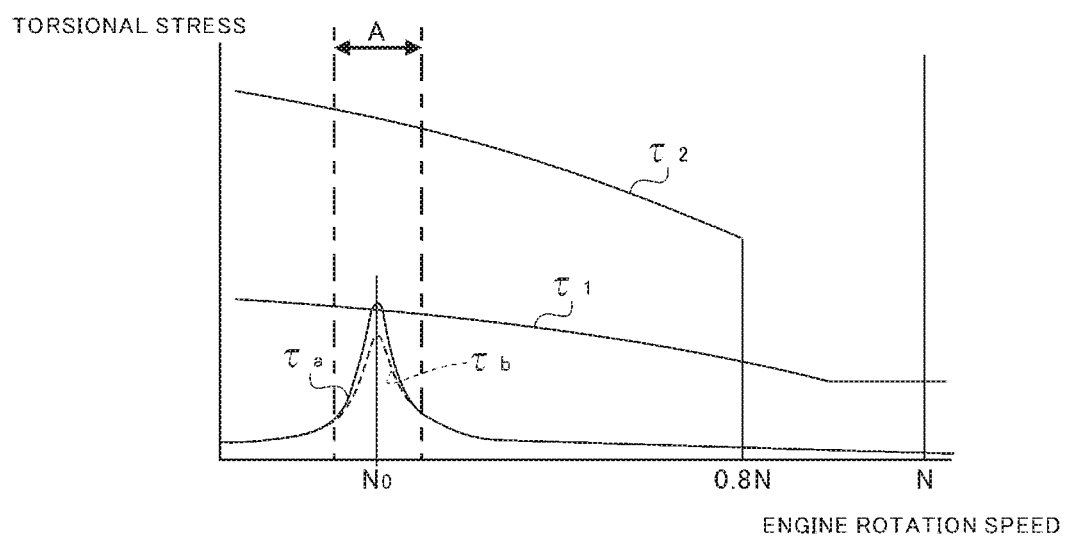
FIG. 4 is a graph for showing a barred range.

FIG. 4 is a graph for showing a barred range A. In FIG. 4, a horizontal axis represents the engine rotation speed, and a vertical axis represents a torsional stress acting on a rotary shaft system including, for example, the crankshaft 120. As shown in FIG. 4, an allowable stress (an allowable stress line 1i in FIG. 4) and a limit stress (a limit stress line 12 in FIG. 4) of the torsional stress are generated in the rotary shaft system in accordance with the engine rotation speed. The allowable stress is a limit value of a stress within a range of safe use. The limit stress is the maximum stress which can be withstood without destruction.

When an excitation force is applied from the piston 112 to the rotary shaft system, torsional vibration occurs. In this state, when the rotary shaft system resonates, the torsional stress (a high compression ratio torsional stress τa and a low compression ratio torsional stress τb of FIG. 4) excessively increases. Therefore, in a related-art marine engine, there is a risk in that the torsional stress may exceed the allowable stress depending on design.

The barred range A is defined for the marine engine designed in such a manner. When the engine rotation speed falls into the barred range A, engine output is automatically controlled so that the engine rotation speed falls out of the barred range A. As a result, an increase section of the torsional stress is reduced. However, navigation in the barred range A cannot be maintained, and operability thus decreases.

Figure 5A:
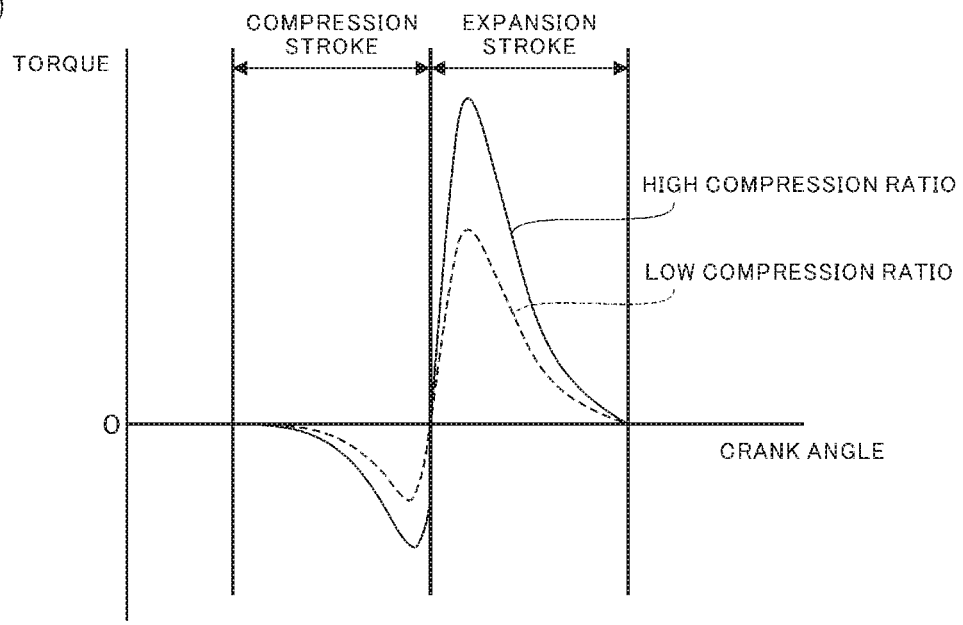
FIG. 5(a) is a graph for showing a relationship between torque acting on a crankshaft and a compression ratio.
Figure 5B:
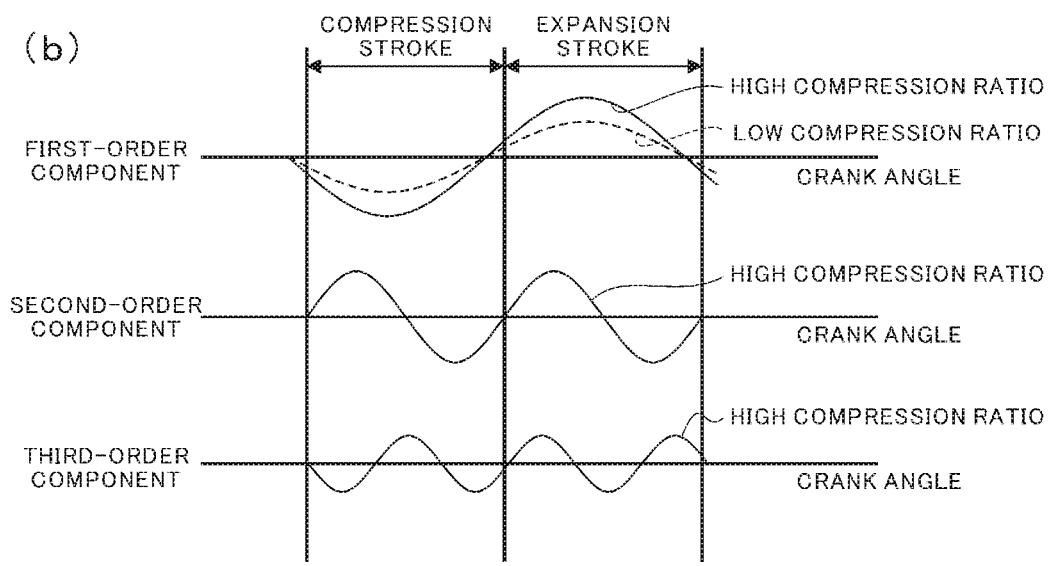
FIG. 5(b) is a graph for showing a result of harmonic analysis on a variation of the torque shown in FIG. 5(a).

FIG. 5(a) is a graph for showing a relationship between torque acting on the crankshaft 120 and the compression ratio. FIG. 5(b) is a graph for showing a result of harmonic analysis on a variation of the torque shown in FIG. 5(a). In FIG. 5(a) and FIG. 5(b), a vertical axis represents the torque acting on the crankshaft 120. In FIG. 5(a) and FIG. 5(b), a horizontal axis represents the crank angle.

In FIG. 5(b), components up to the third order are shown, and fourth and higher-order components are omitted. As shown in FIG. 5(b), an amplitude decreases as the order increases toward higher orders, for example, the first order, the second order, and the third order. That is, the first-order component has the largest influence on the amplitude of the variation of the torque of the analysis source shown in FIG. 5(a).

The amplitude of the first-order component indicated by the broken line in a case of a low compression ratio shown in FIG. 5(b) is smaller than that indicated by the solid line in a case of a high compression ratio. This phenomenon indicates that the excitation force (excitation torque) is suppressed through reduction of the compression ratio. The torsional stress caused by the variation of the torque is also lower in the case of the low compression ratio than that in the case of the high compression ratio.

Thus, when the engine rotation speed indicated by the signal from the rotation sensor Sa falls within the resonance occurrence range set in advance, the compression ratio controller 182 executes the lowering processing of moving the top dead center position of the piston 112 toward the bottom dead center side. The resonance occurrence range is, for example, a range of the engine rotation speed in which there is a risk in that the torsional stress may exceed the allowable stress.

For example, it is assumed that the barred range A shown in FIG. 4 is set as the resonance occurrence range. In FIG. 4, the high compression ratio torsional stress τa exceeds the allowable stress line $\tau_1$. In this case, the compression ratio controller 182 moves the top dead center position of the piston 112 toward the bottom dead center side so that the torsional stress of the crankshaft 120 approaches the allowable stress of the crankshaft 120 (lowering processing).

Specifically, the crank angle is identified based on the signal from the pulse counter Sb, and a variation of the rotation of the crankshaft 120 is thus identified from a variation of the crank angle. That is, the pulse counter Sb functions as a detector configured to detect the rotation variation of the crankshaft 120. The compression ratio controller 182 is configured to derive the torsional stress from the rotation variation detected by the pulse counter Sb. Then, the compression ratio controller 182 applies feedback control to the top dead center position of the piston 112 so that the torsional stress approaches the allowable stress.

For example, in the example shown in FIG. 4, the top dead center position of the piston 112 moves toward the bottom dead center side so that the high compression ratio torsional stress τa does not exceed the allowable stress line τ1.

However, the torsional stress does not become significantly lower than the allowable stress line $\tau_1$, and is close to the allowable stress line $\tau_1$ by the feedback control.

In such a manner, the compression ratio controller 182 executes the lowering processing, and the torsional stress is thus suppressed even when the resonance occurs. Therefore, as described above, it is not required that the engine output be automatically controlled so that the engine rotation speed falls out of the barred range A. That is, the navigation in the barred range A can be maintained, and the operability thus increases.

Moreover, a movement of the top dead center position of the piston 112 toward the bottom dead center side to an unnecessary extent is avoided by the feedback control described above. That is, the compression ratio is maintained so as to be as high as possible in the range in which the torsional stress is equal to or lower than the allowable stress line $\tau_1$. A decrease in thermal efficiency is suppressed by maintaining the compression ratio high.

Figure 6:
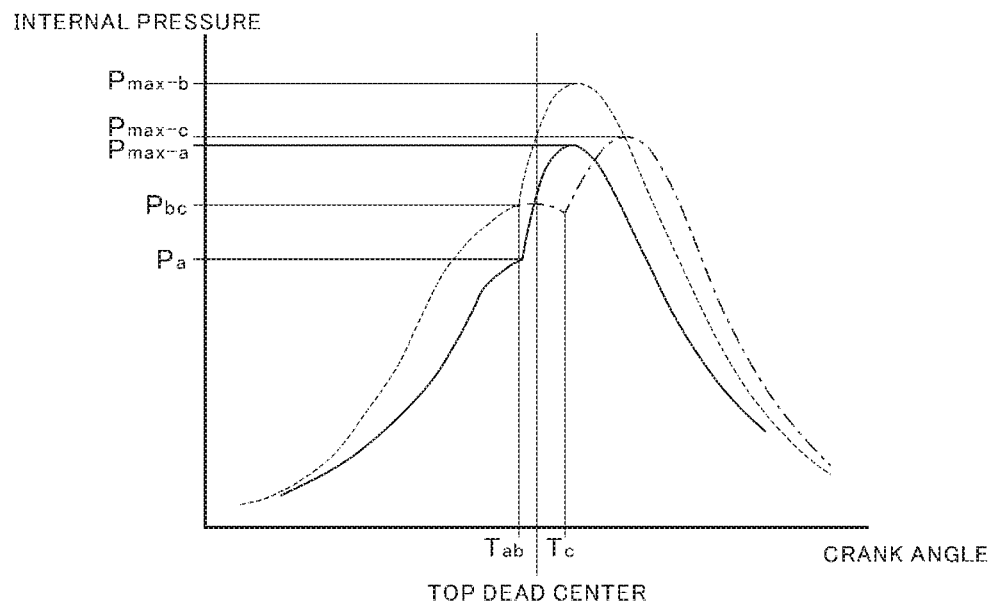
FIG. 6 is a graph for showing a change in cylinder internal pressure.

FIG. 6 is a graph for showing a change in cylinder internal pressure. In FIG. 6, a vertical axis represents the cylinder internal pressure, and a horizontal axis represents the crank angle. As indicated by the broken line in FIG. 6, when the barred range A is not set, the cylinder internal pressure simply increases to a pressure $P_{max-b}$. As a result, as described above, there is a risk in that the torsional stress $\tau a$ may exceed the allowable stress depending on the design.

Thus, it is conceivable to apply retarding control to a fuel injection timing. For example, it is assumed that a fuel injection timing Tc retarded from a fuel injection timing Tab indicated by the broken line in the legend is adopted. In this case, as indicated by the one-dot chain line in FIG. 6, the cylinder internal pressure is suppressed to a pressure $P_{max-c}$. However, the pressure $P_{max-c}$ is reduced while the cylinder internal pressure Pbc before combustion is unchanged, and a degree of explosion ($P_{max-c}$/Pbc) thus decreases.

When the compression ratio is reduced by the lowering processing described above, the cylinder internal pressure Pa before the combustion decreases as indicated by the solid line in FIG. 6. Further, the maximum pressure of the cylinder internal pressure also decreases to a pressure $P_{max-a}$. As a result, the degree of explosion is also higher than that in the case in which the retarding control is applied to the fuel injection timing. That is, the decrease in thermal efficiency is suppressed.

Moreover, it is conceivable to apply retarding control to a closing timing of the exhaust valve 130 without adopting the variable compression ratio mechanism V. In this case, a geometrical compression ratio cannot be changed, but a theoretical compression ratio can be reduced. In this case, the rotary shaft system is designed so that the barred range A is located in a low load region while avoiding a working range. The supercharger C does not satisfactorily function in the low load region, and the air in the scavenge chamber 140a is not sufficiently compressed. Therefore, an air amount in the combustion chamber 128 is liable to decrease. In this state, when the retarding control is applied to the closing timing of the exhaust valve 130, the air amount in the combustion chamber 128 further decreases, and the thermal efficiency thus degrades.

In the marine engine 100, the compression ratio is reduced by the variable compression ratio mechanism V as described before, and a resonance stress caused by the torsional vibration in the rotary system can thus be suppressed while suppressing the decrease in thermal efficiency compared with the case in which the retarding control is applied to the fuel injection timing or the closing timing of the exhaust valve 130.

Figure 7:
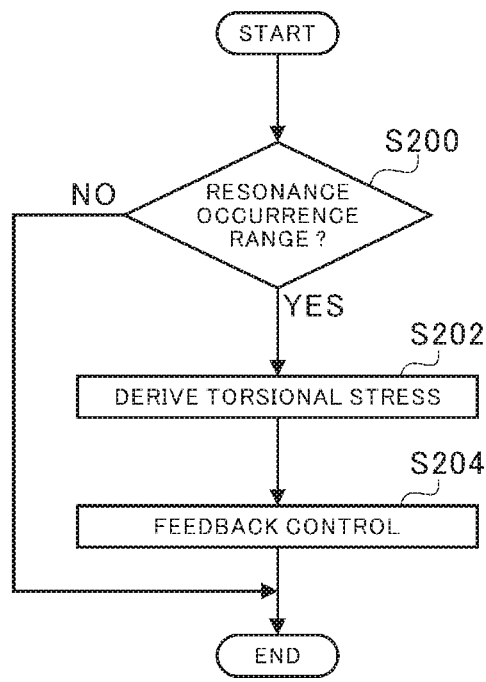
FIG. 7 is a flowchart for illustrating a flow of lowering processing executed by a compression ratio controller.

FIG. 7 is a flowchart for illustrating a flow of the lowering processing by the compression ratio controller 182. The processing illustrated in FIG. 7 is repeated at a predetermined cycle.

(Step S200)

The compression ratio controller 182 determines whether or not the engine rotation speed falls within the resonance occurrence range. When the engine rotation speed falls within the resonance occurrence range, the compression ratio controller 182 allows the processing to proceed to Step S202. When the engine rotation speed does not fall within the resonance occurrence range, the compression ratio controller 182 finishes the lowering processing.

(Step S202)

The compression ratio controller 182 derives the torsional stress from the rotation variation detected by the pulse counter Sb.

(Step S204)

The compression ratio controller 182 applies the feedback control to the top dead center position of the piston 112 so that the torsional stress approaches the allowable stress within the range in which the torsional stress does not exceed the allowable stress. Then, the compression ratio controller 182 finishes the lowering processing.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

For example, in the above-mentioned embodiment, the description is given of the marine engine 100 of the two-cycle type, the uniflow scavenging type, and the crosshead type as an example. However, the type of the engine is not limited to the two-cycle type, the uniflow scavenging type, and the crosshead type. It is required that the present disclosure be applied to a marine engine.

Moreover, in the above-mentioned embodiment, the description is given of the case in which the liquid fuel is used. However, for example, a gas fuel may be used. In this case, in addition to the fuel injection valve 142, a gas fuel injection valve is provided in a vicinity of the scavenging port 110a, or a portion of the cylinder 110 from the scavenging port 110a to the cylinder cover 124. The fuel gas is injected from the gas fuel injection valve, and then flows into the cylinder 110. When a small amount of the liquid fuel is injected from the fuel injection valve 142, a mixture of the fuel gas and active gas is ignited by combustion heat of the liquid fuel, and is then combusted. The fuel gas is gasified LNG, LPG (liquified petroleum gas), light oil, heavy oil, or the like. Moreover, the marine engine 100 may be, for example, of the dual fuel type, which selects a gas fuel or a liquid fuel to be used.

Moreover, in the above-mentioned embodiment, a description is given of the case in which the compression ratio controller 182 controls the top dead center position of the piston 112 so that the torsional stress of the crankshaft 120 approaches the allowable stress of the crankshaft 120 when the engine rotation speed falls within the resonance occurrence range. However, the compression ratio controller 182 only needs to execute the lowering processing of moving the top dead center position of the piston 112 toward the bottom dead center side at least when the engine rotation speed falls within the resonance occurrence range.

Moreover, in the embodiment, a description is given of the case in which the compression ratio controller 182 applies the feedback control to the top dead center position of the piston 112 so that the torsional stress identified from the detected rotation variation approaches the allowable stress. However, the feedback control may not be executed.

Moreover, in the above-mentioned embodiment, a description is given of the case in which the compression ratio controller 182 executes the lowering processing when the engine rotation speed indicated by the signal from the rotation sensor Sa falls within the resonance occurrence range set in advance. However, the compression ratio controller 182 may use other parameters approximately in conjunction with the engine rotation speed in place of the engine rotation speed. In any case, the lowering processing only needs to be executed when the engine rotation speed falls within the resonance occurrence range set in advance.

Moreover, in the above-mentioned embodiment, an example of the variable compression ratio mechanism V is described, but the variable compression ratio mechanism may have any configuration as long as the mechanism changes the top dead center position of the piston 112 so as to be able to change the compression ratio. For example, a hydraulic pressure generation device as described in JP2016-211462A may be provided in place of the hydraulic pressure pump 172.

INDUSTRIAL APPLICABILITY

The present disclosure can be applied to the marine engine.

What is claimed is:

1. A marine engine, comprising:
   a piston; and
   a compression ratio controller configured to move a top dead center position of the piston toward a bottom dead center side so that a torsional stress of a crankshaft does not exceed an allowable stress of the crankshaft when an engine rotation speed falls within a resonance occurrence range set in advance,
   wherein the compression ratio controller is configured to control the top dead center position of the piston so that the torsional stress approaches the allowable stress within a range in which the torsional stress does not exceed the allowable stress as the compression ratio controller moves the top dead center position of the piston toward the bottom dead center position.

2. The marine engine according to claim 1, further comprising:
   a detector configured to detect a rotation variation of the crankshaft,
   wherein the compression ratio controller is configured to apply feedback control to the top dead center position of the piston so that the torsional stress identified from the detected rotation variation approaches the allowable stress within the range in which the torsional stress does not exceed the allowable stress as the compression ratio controller moves the top dead center position of the piston toward the bottom dead center position.

* * * * *